United States Patent
Foat (10) Patent No.: US 12,269,502 B2
(45) Date of Patent: Apr. 8, 2025

(54) SYSTEMS AND TECHNIQUES FOR SIMULATING MOVEMENT OF ARTICULATED VEHICLES

(71) Applicant: GM Cruise Holdings LLC, San Francisco, CA (US)

(72) Inventor: Jason Edward Foat, San Diego, CA (US)

(73) Assignee: GM Cruise Holdings LLC, San Francisco, CA (US)

( * ) Notice: Subject to any disclaimer, the term of this patent is extended or adjusted under 35 U.S.C. 154(b) by 302 days.

(21) Appl. No.: 17/887,905

(22) Filed: Aug. 15, 2022

(65) Prior Publication Data

US 2024/0051570 A1 Feb. 15, 2024

(51) Int. Cl.
*B60W 60/00* (2020.01)
*B62D 13/00* (2006.01)

(52) U.S. Cl.
CPC ......... *B60W 60/001* (2020.02); *B62D 13/005* (2013.01); *B60W 2520/12* (2013.01)

(58) Field of Classification Search
None
See application file for complete search history.

(56) References Cited

U.S. PATENT DOCUMENTS

2021/0078603 A1* 3/2021 Nakhaei Sarvedani ................. B60W 30/18163
2021/0380109 A1* 12/2021 Pourrezaei Khaligh ................. B60W 50/14
2022/0250680 A1* 8/2022 Goodarzi .............. B60D 1/58
2023/0249711 A1* 8/2023 Hardy ............. B60W 30/18145 701/24

FOREIGN PATENT DOCUMENTS

CN 108871338 A 11/2018

OTHER PUBLICATIONS

Hao Lin, Kinematics and Dynamics Modelling of All Terrain Articulated Tracked Vehicles, 2016, IEEE.com (Year: 2016).*
Maciej Marcin Michałek, Modular Kinematic Modelling of Articulated Buses, 2020, IEEE.com (Year: 2020).*
Xinxin Zhao, A Path Tracking Algorithm for Articulated Vehicle: development and simulations, 2017, IEEE.com (Year: 2017).*

* cited by examiner

Primary Examiner — Christian Chace
Assistant Examiner — Shayne M. Gilbertson (57) ABSTRACT

Systems and techniques are provided for simulating movement of an articulated vehicle. An example method can include generating a simulation environment for an autonomous vehicle, wherein the simulation environment includes at least one articulated vehicle that includes a tractor coupled to a first trailer using a first pivot joint; determining a first velocity of the first pivot joint based on a first simulated movement associated with the tractor; and determining a second simulated movement associated with the first trailer based on the first velocity of the first pivot joint and a first distance between the first pivot joint and a first point on the first trailer.

16 Claims, 7 Drawing Sheets

SYSTEMS AND TECHNIQUES FOR SIMULATING MOVEMENT OF ARTICULATED VEHICLES

BACKGROUND

1. Technical Field

The present disclosure generally relates to autonomous vehicles and, more specifically, to providing a simulation environment that accurately models movement of articulated vehicles.

2. Introduction

An autonomous vehicle is a motorized vehicle that can navigate without a human driver. An exemplary autonomous vehicle can include various sensors, such as a camera sensor, a light detection and ranging (LIDAR) sensor, and a radio detection and ranging (RADAR) sensor, amongst others. The sensors collect data and measurements that the autonomous vehicle can use for operations such as navigation. The sensors can provide the data and measurements to an internal computing system of the autonomous vehicle, which can use the data and measurements to control a mechanical system of the autonomous vehicle, such as a vehicle propulsion system, a braking system, or a steering system. Typically, the sensors are mounted at fixed locations on the autonomous vehicles.

BRIEF DESCRIPTION OF THE DRAWINGS

The various advantages and features of the present technology will become apparent by reference to specific implementations illustrated in the appended drawings. A person of ordinary skill in the art will understand that these drawings only show some examples of the present technology and would not limit the scope of the present technology to these examples. Furthermore, the skilled artisan will appreciate the principles of the present technology as described and explained with additional specificity and detail through the use of the accompanying drawings in which.

DETAILED DESCRIPTION

The detailed description set forth below is intended as a description of various configurations of the subject technology and is not intended to represent the only configurations in which the subject technology can be practiced. The appended drawings are incorporated herein and constitute a part of the detailed description. The detailed description includes specific details for the purpose of providing a more thorough understanding of the subject technology. However, it will be clear and apparent that the subject technology is not limited to the specific details set forth herein and may be practiced without these details. In some instances, structures and components are shown in block diagram form in order to avoid obscuring the concepts of the subject technology.

One aspect of the present technology is the gathering and use of data available from various sources to improve quality and experience. The present disclosure contemplates that in some instances, this gathered data may include personal information. The present disclosure contemplates that the entities involved with such personal information respect and value privacy policies and practices.

Autonomous vehicles (AVs), also known as self-driving cars, driverless vehicles, and robotic vehicles, are vehicles that use sensors to sense the environment and move without human input. For example, AVs can include sensors such as a camera sensor, a LIDAR sensor, and/or a RADAR sensor, amongst others, which the AVs can use to collect data and measurements that are used for various AV operations. The sensors can provide the data and measurements to an internal computing system of the autonomous vehicle, which can use the data and measurements to control mechanical systems of the autonomous vehicle, such as a vehicle propulsion system, a braking system, and/or a steering system, etc.

In some cases, AV operations can be simulated using a computer simulation environment. In some aspects, a computer simulation environment can be used to calibrate and/or tune AV sensors. In some examples, a computer simulation environment can be used to train and/or evaluate artificial intelligence (AI) and/or machine learning (ML) algorithms used by the AV to navigate real-world scenarios. For instance, a computer simulation environment can be used to train the AI/ML algorithms that control the AV for detecting and maneuvering in the presence of pedestrians, vehicles, cyclists, accidents, construction, adverse weather conditions, etc. In some cases, AV operations can be improved by providing a simulation environment that accurately models real-world environments.

Systems and techniques are provided herein for simulating movement of articulated vehicles. In some aspects, an articulated vehicle can correspond to any vehicle that includes a tractor and a trailer (e.g., a front vehicle and a rear vehicle, respectively) that are coupled to each other using a pivot joint (e.g., a hitch). Examples of articulated vehicles include but are not limited to buses, trucks, heavy equipment, tow trucks, fire engines, bikes with trailers, road trains, cars/trucks with trailers, etc. In some cases, an articulated vehicle may include multiple trailers (e.g., a single tractor can pull multiple trailers).

In some aspects, movement of an articulated vehicle can be simulated based on the velocity of the trailer at the pivot joint (e.g., velocity of hitch) and the length of the trailer. In some cases, the length of the trailer can be the length from the pivot joint to a reference point on the trailer. In some instances, the reference point for determining the length of the trailer may correspond to a center of a wheel axel. In some examples, the reference point for determining the length of the trailer may correspond to a center of gravity of the trailer. In some aspects, the reference point for determining the length of the trailer can be determined based on a kinematic bicycle model (KBM).

Figure 1:
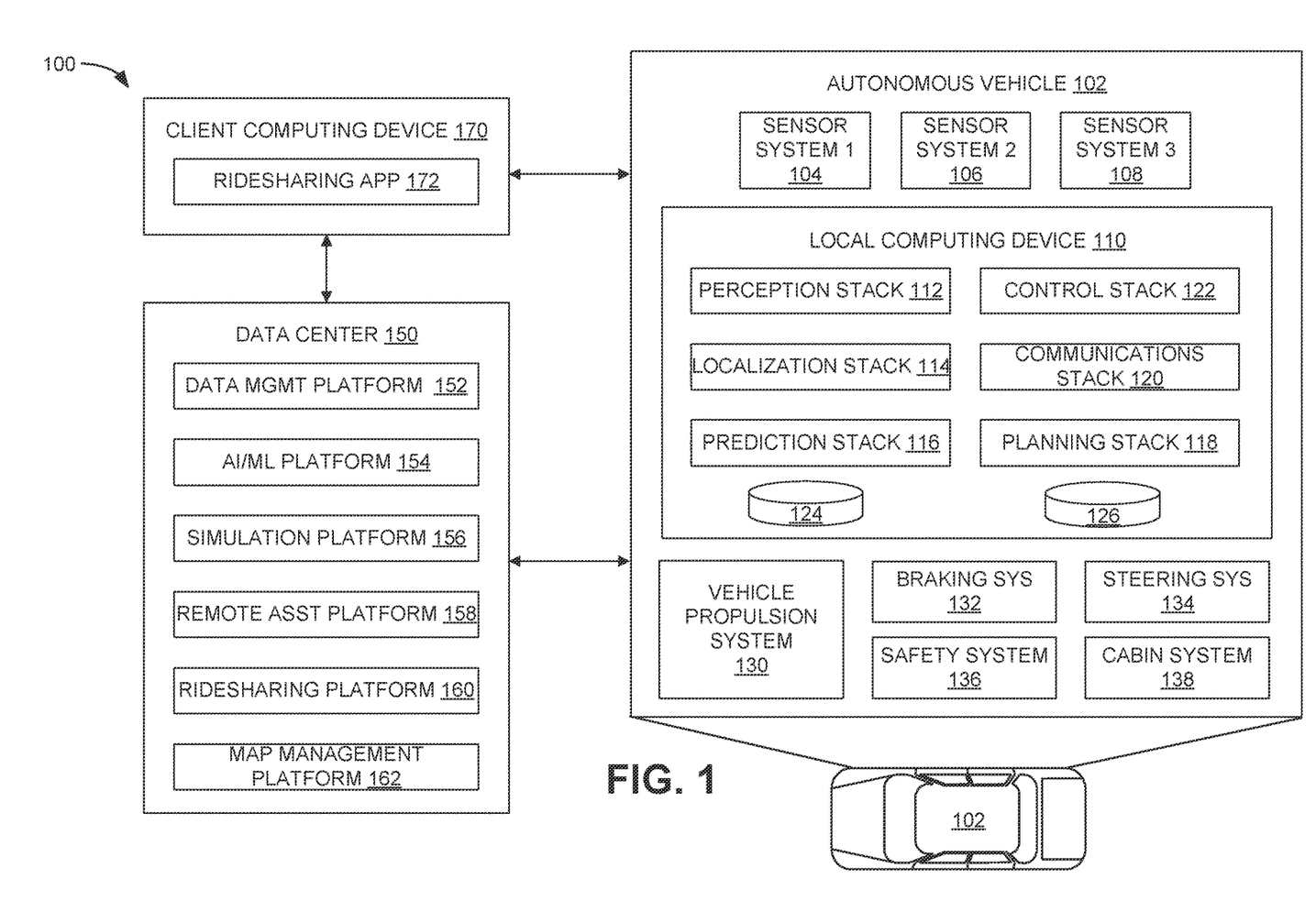
FIG. 1 is a diagram illustrating an example system environment that can be used to facilitate autonomous vehicle (AV) navigation and routing operations, in accordance with some examples of the present disclosure.

FIG. 1 is a diagram illustrating an example autonomous vehicle (AV) management system 100, according to some examples of the present disclosure. One of ordinary skill in the art will understand that, for the AV management system 100 and any system discussed in the present disclosure, there can be additional or fewer components in similar or alternative configurations. The illustrations and examples provided in the present disclosure are for conciseness and clarity. Other examples may include different numbers and/or types of elements, but one of ordinary skill the art will appreciate that such variations do not depart from the scope of the present disclosure.

In this example, the AV management system 100 includes an AV 102, a data center 150, and a client computing device 170. The AV 102, the data center 150, and the client computing device 170 can communicate with one another over one or more networks (not shown), such as a public network (e.g., the Internet, an Infrastructure as a Service (IaaS) network, a Platform as a Service (PaaS) network, a Software as a Service (SaaS) network, other Cloud Service Provider (CSP) network, etc.), a private network (e.g., a Local Area Network (LAN), a private cloud, a Virtual Private Network (VPN), etc.), and/or a hybrid network (e.g., a multi-cloud or hybrid cloud network, etc.).

The AV 102 can navigate roadways without a human driver based on sensor signals generated by multiple sensor systems 104, 106, and 108. The sensor systems 104-108 can include one or more types of sensors and can be arranged about the AV 102. For instance, the sensor systems 104-108 can include Inertial Measurement Units (IMUs), cameras (e.g., still image cameras, video cameras, etc.), light sensors (e.g., LIDAR systems, ambient light sensors, infrared sensors, etc.), RADAR systems, GPS receivers, audio sensors (e.g., microphones, Sound Navigation and Ranging (SONAR) systems, ultrasonic sensors, etc.), engine sensors, speedometers, tachometers, odometers, altimeters, tilt sensors, impact sensors, airbag sensors, seat occupancy sensors, open/closed door sensors, tire pressure sensors, rain sensors, and so forth. For example, the sensor system 104 can be a camera system, the sensor system 106 can be a LIDAR system, and the sensor system 108 can be a RADAR system. Other examples may include any other number and type of sensors.

The AV 102 can also include several mechanical systems that can be used to maneuver or operate the AV 102. For instance, the mechanical systems can include a vehicle propulsion system 130, a braking system 132, a steering system 134, a safety system 136, and a cabin system 138, among other systems. The vehicle propulsion system 130 can include an electric motor, an internal combustion engine, or both. The braking system 132 can include an engine brake, brake pads, actuators, and/or any other suitable componentry configured to assist in decelerating the AV 102. The steering system 134 can include suitable componentry configured to control the direction of movement of the AV 102 during navigation. The safety system 136 can include lights and signal indicators, a parking brake, airbags, and so forth. The cabin system 138 can include cabin temperature control systems, in-cabin entertainment systems, and so forth. In some examples, the AV 102 might not include human driver actuators (e.g., steering wheel, handbrake, foot brake pedal, foot accelerator pedal, turn signal lever, window wipers, etc.) for controlling the AV 102. Instead, the cabin system 138 can include one or more client interfaces (e.g., Graphical User Interfaces (GUIs), Voice User Interfaces (VUIs), etc.) for controlling certain aspects of the mechanical systems 130-138.

The AV 102 can include a local computing device 110 that is in communication with the sensor systems 104-108, the mechanical systems 130-138, the data center 150, and the client computing device 170, among other systems. The local computing device 110 can include one or more processors and memory, including instructions that can be executed by the one or more processors. The instructions can make up one or more software stacks or components responsible for controlling the AV 102; communicating with the data center 150, the client computing device 170, and other systems; receiving inputs from riders, passengers, and other entities within the AV's environment; logging metrics collected by the sensor systems 104-108; and so forth. In this example, the local computing device 110 includes a perception stack 112, a mapping and localization stack 114, a prediction stack 116, a planning stack 118, a communications stack 120, a control stack 122, an AV operational database 124, and an HD geospatial database 126, among other stacks and systems.

The perception stack 112 can enable the AV 102 to "see" (e.g., via cameras, LIDAR sensors, infrared sensors, etc.), "hear" (e.g., via microphones, ultrasonic sensors, RADAR, etc.), and "feel" (e.g., pressure sensors, force sensors, impact sensors, etc.) its environment using information from the sensor systems 104-108, the mapping and localization stack 114, the HD geospatial database 126, other components of the AV, and other data sources (e.g., the data center 150, the client computing device 170, third party data sources, etc.). The perception stack 112 can detect and classify objects and determine their current locations, speeds, directions, and the like. In addition, the perception stack 112 can determine the free space around the AV 102 (e.g., to maintain a safe distance from other objects, change lanes, park the AV, etc.). The perception stack 112 can identify environmental uncertainties, such as where to look for moving objects, flag areas that may be obscured or blocked from view, and so forth. In some examples, an output of the prediction stack can be a bounding area around a perceived object that can be associated with a semantic label that identifies the type of object that is within the bounding area, the kinematic of the object (information about its movement), a tracked path of the object, and a description of the pose of the object (its orientation or heading, etc.).

The mapping and localization stack 114 can determine the AV's position and orientation (pose) using different methods from multiple systems (e.g., GPS, IMUs, cameras, LIDAR, RADAR, ultrasonic sensors, the HD geospatial database 126, etc.). For example, in some cases, the AV 102 can compare sensor data captured in real-time by the sensor systems 104-108 to data in the HD geospatial database 126 to determine its precise (e.g., accurate to the order of a few centimeters or less) position and orientation. The AV 102 can focus its search based on sensor data from one or more first sensor systems (e.g., GPS) by matching sensor data from one or more second sensor systems (e.g., LIDAR). If the mapping and localization information from one system is unavailable, the AV 102 can use mapping and localization information from a redundant system and/or from remote data sources.

The prediction stack 116 can receive information from the localization stack 114 and objects identified by the perception stack 112 and predict a future path for the objects. In some examples, the prediction stack 116 can output several likely paths that an object is predicted to take along with a probability associated with each path. For each predicted path, the prediction stack 116 can also output a range of points along the path corresponding to a predicted location of the object along the path at future time intervals along with an expected error value for each of the points that indicates a probabilistic deviation from that point.

The planning stack 118 can determine how to maneuver or operate the AV 102 safely and efficiently in its environment. For example, the planning stack 118 can receive the location, speed, and direction of the AV 102, geospatial data, data regarding objects sharing the road with the AV 102 (e.g., pedestrians, bicycles, vehicles, ambulances, buses, cable cars, trains, traffic lights, lanes, road markings, etc.) or certain events occurring during a trip (e.g., emergency vehicle blaring a siren, intersections, occluded areas, street closures for construction or street repairs, double-parked cars, etc.), traffic rules and other safety standards or practices for the road, user input, and other relevant data for directing the AV 102 from one point to another and outputs from the perception stack 112, localization stack 114, and prediction stack 116. The planning stack 118 can determine multiple sets of one or more mechanical operations that the AV 102 can perform (e.g., go straight at a specified rate of acceleration, including maintaining the same speed or decelerating; turn on the left blinker, decelerate if the AV is above a threshold range for turning, and turn left; turn on the right blinker, accelerate if the AV is stopped or below the threshold range for turning, and turn right, decelerate until completely stopped and reverse; etc.), and select the best one to meet changing road conditions and events. If something unexpected happens, the planning stack 118 can select from multiple backup plans to carry out. For example, while preparing to change lanes to turn right at an intersection, another vehicle may aggressively cut into the destination lane, making the lane change unsafe. The planning stack 118 could have already determined an alternative plan for such an event. Upon its occurrence, it could help direct the AV 102 to go around the block instead of blocking a current lane while waiting for an opening to change lanes.

The control stack 122 can manage the operation of the vehicle propulsion system 130, the braking system 132, the steering system 134, the safety system 136, and the cabin system 138. The control stack 122 can receive sensor signals from the sensor systems 104-108 as well as communicate with other stacks or components of the local computing device 110 or a remote system (e.g., the data center 150) to effectuate operation of the AV 102. For example, the control stack 122 can implement the final path or actions from the multiple paths or actions provided by the planning stack 118. This can involve turning the routes and decisions from the planning stack 118 into commands for the actuators that control the AV's steering, throttle, brake, and drive unit.

The communications stack 120 can transmit and receive signals between the various stacks and other components of the AV 102 and between the AV 102, the data center 150, the client computing device 170, and other remote systems. The communications stack 120 can enable the local computing device 110 to exchange information remotely over a network, such as through an antenna array or interface that can provide a metropolitan WIFI network connection, a mobile or cellular network connection (e.g., Third Generation (3G), Fourth Generation (4G), Long-Term Evolution (LTE), 5th Generation (5G), etc.), and/or other wireless network connection (e.g., License Assisted Access (LAA), Citizens Broadband Radio Service (CBRS), MULTEFIRE, etc.). The communications stack 120 can also facilitate the local exchange of information, such as through a wired connection (e.g., a user's mobile computing device docked in an in-car docking station or connected via Universal Serial Bus (USB), etc.) or a local wireless connection (e.g., Wireless Local Area Network (WLAN), Bluetooth®, infrared, etc.).

The HD geospatial database 126 can store HD maps and related data of the streets upon which the AV 102 travels. In some examples, the HD maps and related data can comprise multiple layers, such as an areas layer, a lanes and boundaries layer, an intersections layer, a traffic controls layer, and so forth. The areas layer can include geospatial information indicating geographic areas that are drivable (e.g., roads, parking areas, shoulders, etc.) or not drivable (e.g., medians, sidewalks, buildings, etc.), drivable areas that constitute links or connections (e.g., drivable areas that form the same road) versus intersections (e.g., drivable areas where two or more roads intersect), and so on. The lanes and boundaries layer can include geospatial information of road lanes (e.g., lane centerline, lane boundaries, type of lane boundaries, etc.) and related attributes (e.g., direction of travel, speed limit, lane type, etc.). The lanes and boundaries layer can also include three-dimensional (3D) attributes related to lanes (e.g., slope, elevation, curvature, etc.). The intersections layer can include geospatial information of intersections (e.g., crosswalks, stop lines, turning lane centerlines and/or boundaries, etc.) and related attributes (e.g., permissive, protected/permissive, or protected only left turn lanes; legal or illegal u-turn lanes; permissive or protected only right turn lanes; etc.). The traffic controls lane can include geospatial information of traffic signal lights, traffic signs, and other road objects and related attributes.

The AV operational database 124 can store raw AV data generated by the sensor systems 104-108, stacks 112-122, and other components of the AV 102 and/or data received by the AV 102 from remote systems (e.g., the data center 150, the client computing device 170, etc.). In some examples, the raw AV data can include HD LIDAR point cloud data, image data, RADAR data, GPS data, and other sensor data that the data center 150 can use for creating or updating AV geospatial data or for creating simulations of situations encountered by AV 102 for future testing or training of various machine learning algorithms that are incorporated in the local computing device 110.

The data center 150 can include a private cloud (e.g., an enterprise network, a co-location provider network, etc.), a public cloud (e.g., an Infrastructure as a Service (IaaS) network, a Platform as a Service (PaaS) network, a Software as a Service (SaaS) network, or other Cloud Service Provider (CSP) network), a hybrid cloud, a multi-cloud, and/or any other network. The data center 150 can include one or more computing devices remote to the local computing device 110 for managing a fleet of AVs and AV-related services. For example, in addition to managing the AV 102, the data center 150 may also support a ridesharing service, a delivery service, a remote/roadside assistance service, street services (e.g., street mapping, street patrol, street cleaning, street metering, parking reservation, etc.), and the like.

The data center 150 can send and receive various signals to and from the AV 102 and the client computing device 170. These signals can include sensor data captured by the sensor systems 104-108, roadside assistance requests, software updates, ridesharing pick-up and drop-off instructions, and so forth. In this example, the data center 150 includes a data management platform 152, an Artificial Intelligence/Machine Learning (AI/ML) platform 154, a simulation platform 156, a remote assistance platform 158, and a ridesharing platform 160, and a map management platform 162, among other systems.

The data management platform 152 can be a "big data" system capable of receiving and transmitting data at high velocities (e.g., near real-time or real-time), processing a large variety of data and storing large volumes of data (e.g., terabytes, petabytes, or more of data). The varieties of data can include data having different structures (e.g., structured, semi-structured, unstructured, etc.), data of different types (e.g., sensor data, mechanical system data, ridesharing service, map data, audio, video, etc.), data associated with different types of data stores (e.g., relational databases, key-value stores, document databases, graph databases, column-family databases, data analytic stores, search engine databases, time series databases, object stores, file systems, etc.), data originating from different sources (e.g., AVs, enterprise systems, social networks, etc.), data having different rates of change (e.g., batch, streaming, etc.), and/or data having other characteristics. The various platforms and systems of the data center 150 can access data stored by the data management platform 152 to provide their respective services.

The AI/ML platform 154 can provide the infrastructure for training and evaluating machine learning algorithms for operating the AV 102, the simulation platform 156, the remote assistance platform 158, the ridesharing platform 160, the map management platform 162, and other platforms and systems. Using the AI/ML platform 154, data scientists can prepare data sets from the data management platform 152; select, design, and train machine learning models; evaluate, refine, and deploy the models; maintain, monitor, and retrain the models; and so on.

The simulation platform 156 can enable testing and validation of the algorithms, machine learning models, neural networks, and other development efforts for the AV 102, the remote assistance platform 158, the ridesharing platform 160, the map management platform 162, and other platforms and systems. The simulation platform 156 can replicate a variety of driving environments and/or reproduce real-world scenarios from data captured by the AV 102, including rendering geospatial information and road infrastructure (e.g., streets, lanes, crosswalks, traffic lights, stop signs, etc.) obtained from a cartography platform (e.g., map management platform 162); modeling the behavior of other vehicles, bicycles, pedestrians, and other dynamic elements; simulating inclement weather conditions, different traffic scenarios; and so on.

The remote assistance platform 158 can generate and transmit instructions regarding the operation of the AV 102. For example, in response to an output of the AI/ML platform 154 or other system of the data center 150, the remote assistance platform 158 can prepare instructions for one or more stacks or other components of the AV 102.

The ridesharing platform 160 can interact with a customer of a ridesharing service via a ridesharing application 172 executing on the client computing device 170. The client computing device 170 can be any type of computing system such as, for example and without limitation, a server, desktop computer, laptop computer, tablet computer, smartphone, smart wearable device (e.g., smartwatch, smart eyeglasses or other Head-Mounted Display (HMD), smart ear pods, or other smart in-ear, on-ear, or over-ear device, etc.), gaming system, or any other computing device for accessing the ridesharing application 172. The client computing device 170 can be a customer's mobile computing device or a computing device integrated with the AV 102 (e.g., the local computing device 110). The ridesharing platform 160 can receive requests to pick up or drop off from the ridesharing application 172 and dispatch the AV 102 for the trip.

Map management platform 162 can provide a set of tools for the manipulation and management of geographic and spatial (geospatial) and related attribute data. The data management platform 152 can receive LIDAR point cloud data, image data (e.g., still image, video, etc.), RADAR data, GPS data, and other sensor data (e.g., raw data) from one or more AVs 102, Unmanned Aerial Vehicles (UAVs), satellites, third-party mapping services, and other sources of geospatially referenced data. The raw data can be processed, and map management platform 162 can render base representations (e.g., tiles (2D), bounding volumes (3D), etc.) of the AV geospatial data to enable users to view, query, label, edit, and otherwise interact with the data. Map management platform 162 can manage workflows and tasks for operating on the AV geospatial data. Map management platform 162 can control access to the AV geospatial data, including granting or limiting access to the AV geospatial data based on user-based, role-based, group-based, task-based, and other attribute-based access control mechanisms. Map management platform 162 can provide version control for the AV geospatial data, such as to track specific changes that (human or machine) map editors have made to the data and to revert changes when necessary. Map management platform 162 can administer release management of the AV geospatial data, including distributing suitable iterations of the data to different users, computing devices, AVs, and other consumers of HD maps. Map management platform 162 can provide analytics regarding the AV geospatial data and related data, such as to generate insights relating to the throughput and quality of mapping tasks.

In some aspects, the map viewing services of map management platform 162 can be modularized and deployed as part of one or more of the platforms and systems of the data center 150. For example, the A/ML platform 154 may incorporate the map viewing services for visualizing the effectiveness of various object detection or object classification models, the simulation platform 156 may incorporate the map viewing services for recreating and visualizing certain driving scenarios, the remote assistance platform 158 may incorporate the map viewing services for replaying traffic incidents to facilitate and coordinate aid, the ridesharing platform 160 may incorporate the map viewing services into the client application 172 to enable passengers to view the AV 102 in transit en route to a pick-up or drop-off location, and so on.

While the autonomous vehicle 102, the local computing device 110, and the autonomous vehicle environment 100 are shown to include certain systems and components, one of ordinary skill will appreciate that the autonomous vehicle 102, the local computing device 110, and/or the autonomous vehicle environment 100 can include more or fewer systems and/or components than those shown in FIG. 1. For example, the autonomous vehicle 102 can include other services than those shown in FIG. 1 and the local computing device 110 can also include, in some instances, one or more memory devices (e.g., RAM, ROM, cache, and/or the like), one or more network interfaces (e.g., wired and/or wireless communications interfaces and the like), and/or other hardware or processing devices that are not shown in FIG. 1. An illustrative example of a computing device and hardware components that can be implemented with the local computing device 110 is described below with respect to FIG. 7.

Figure 2:
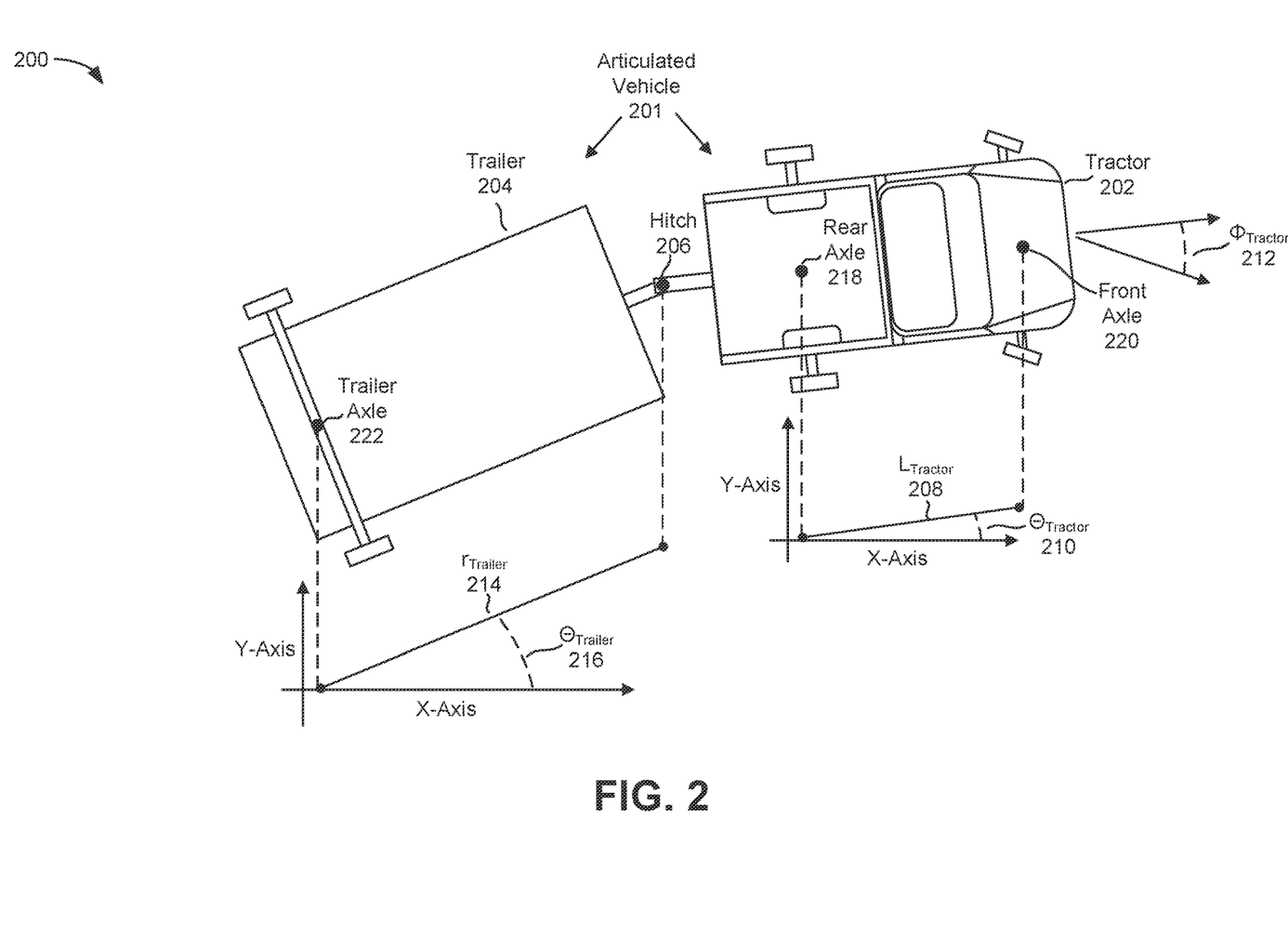
FIG. 2 is a diagram illustrating an example system for simulating movement of an articulated vehicle, in accordance with some examples of the present disclosure.

FIG. 2 illustrates an example system 200 for simulating movement of an articulated vehicle. In some aspects, system 200 can correspond to a simulation environment for training and/or testing an autonomous vehicle (e.g., system 200 can be configured as part of simulation platform 156 for testing/ training AV 102). In some examples, system 200 can include an articulated vehicle 201. In some examples, articulated vehicle 201 can include tractor 202 and trailer 204. In some cases, tractor 202 and trailer 204 can be coupled to each other by hitch 206 (e.g., pivot joint, connector, fastener, clamp, etc.). In some instances, articulated vehicle 201 can include buses, trucks, heavy equipment, tow trucks, fire engines, bikes with trailers, road trains, cars/trucks with trailers, and/or any other vehicle having a front vehicle (e.g., tractor 202) coupled to one or more rear vehicles (e.g., trailer 204).

In some aspects, vehicle dynamics (e.g., position, heading, angular velocity, etc.) of tractor 202 can be determined using one or more models. In some examples, a kinematic bicycle model (KBM) can be used to determine vehicle dynamics corresponding to tractor 202. In some cases, vehicle dynamics of tractor 202 can be based on the velocity v of tractor 202 and/or the steering angle $\Phi_{Tractor}$ 212 of tractor 202. In some examples, the steering angle $\Phi_{Tractor}$ 212 can correspond to a combination (e.g., average) of the steering angle for each of the front tires of tractor 202.

In some cases, the velocity v of tractor 202 can be determined at any reference point of tractor 202. In some instances, the velocity v can be determined at a point corresponding to the center of rear axle (e.g., rear axle 218). In some examples, the velocity v can be determined at a point corresponding to the center of a front axle (e.g., front axle 220). In some cases, the velocity v can be determined at a point corresponding to hitch 206. In some aspects, the velocity v can be determined at a point corresponding to the center of gravity of tractor 202 (not illustrated). In some examples, the velocity v can be separated into 'x' and 'y' components, as follows:

$$\dot{x} = v^* \cos(\theta_{Tractor}) \quad (1)$$

$$\dot{y} = v^* \sin(\theta_{Tractor}) \quad (2)$$

In some examples, the angular acceleration can be determined based on the vehicle heading $\theta_{Tractor}$ 210 and the distance $L_{Tractor}$ 208 which corresponds to the distance between front axle 220 and rear axle 218, as follows:

$$\dot{\theta}_{Tractor} = \frac{v * \tan(\Phi_{Tractor})}{L_{Tractor}} \quad (3)$$

In some aspects, vehicle dynamics (e.g., position, heading, angular velocity, etc.) of trailer 204 can be determined using one or more models. In some examples, a KBM model can be used to replace the trailer wheels with a single effective wheel that can be positioned at the center of trailer axle 222. In some instances, a model may be used that positions a single effective wheel at the center of gravity of trailer 204. In some cases, the velocity v of hitch 206 as calculated with respect to tractor 202 can be the same as the velocity v of hitch 206 with respect to trailer 204 (e.g., tractor hitch and trailer hitch can have the same velocity v).

Figure 3:
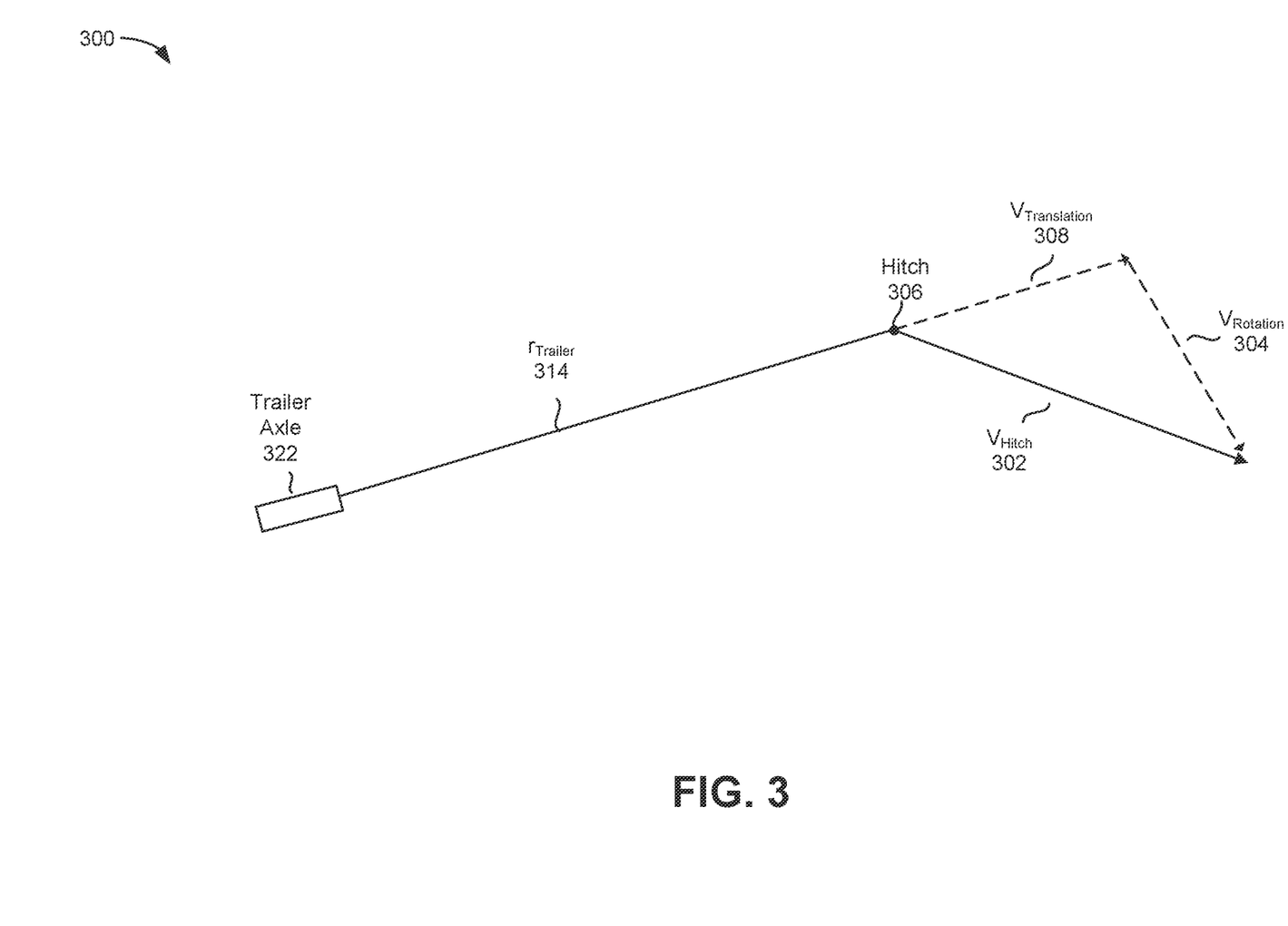
FIG. 3 is a diagram illustrating an example of the components for the velocity of a trailer, in accordance with some examples of the present disclosure.

FIG. 3 illustrates an example system 300 for determining velocity v of hitch 306 (e.g., hitch 206). In some aspects, hitch 306 can correspond to a pivot joint between a trailer (e.g., trailer 204) and a tractor (e.g., tractor 202). In some examples, the trailer can have a length $r_{Trailer}$ 314 corresponding to the length between hitch 306 and trailer axle 322. In some cases, the velocity v of hitch 306 can be illustrated as a vector $V_{Hitch}$ 302. In some instances, $V_{Hitch}$ 302 can be decomposed into a first component that is along same direction as a trailer axis and a second component that is perpendicular to a trailer axis (e.g., components that are along same line as $r_{Trailer}$ 314 and perpendicular to $r_{Trailer}$ 314). For example, $V_{Hitch}$ 302 can be decomposed into $V_{Translation}$ 308 and $V_{Rotation}$ 304, which can be represented as follows:

$$V_{Hitch} = V_{Translation} + V_{Rotation} \quad (4)$$

Returning to FIG. 2, the heading $\theta_{Trailer}$ 216 of trailer 204 and the velocity of hitch 206 can be used to determine trailer dynamics. For example, using trailer axle 222 (e.g., center of trailer axle) as a reference point, the length $r_{Trailer}$ 214 between hitch 206 and trailer axle 222 can be used to determine the angular acceleration of trailer 204. In some examples, the angular acceleration $\theta_{Trailer}$ can be determined according to equation (5), as follows:

$$\frac{d}{dt}\theta_{Trailer} = \frac{|r_{Trailer} \times V_{Hitch}|}{r_{Trailer}^2} \quad (5)$$

In some aspects, trailer dynamics of trailer 204 are not dependent on the geometry of tractor 202. For instance, equation (5) above can be used to determine angular acceleration of trailer 204 independent of the geometry of tractor 202.

In some examples, simulated dynamics of an articulated vehicle (e.g., tractor 202 and/or trailer 204) can be used to configure operation of an autonomous vehicle (e.g., AV 102). For example, the perception stack 112 of AV 102 may be used to detect or identify an articulated vehicle. In some cases, the perception stack 112 may identify parameters or dimensions corresponding to an articulated vehicle that can be used to predict movement of the articulated vehicle. For instance, the prediction stack 116 can use data obtained by the perception stack 112 to predict movement of an articulated vehicle based on simulation data (e.g., simulated dynamics of tractor 202 and/or trailer 204). In some aspects, the prediction stack 116 may output one or more likely paths that an articulated vehicle is predicted to take based on simulated dynamics of tractor 202 and/or trailer 204. In some examples, the planning stack 118 can determine how to maneuver or operate the AV 102 safely in the vicinity of an articulated vehicle based on data received from prediction stack 116.

Figure 4:
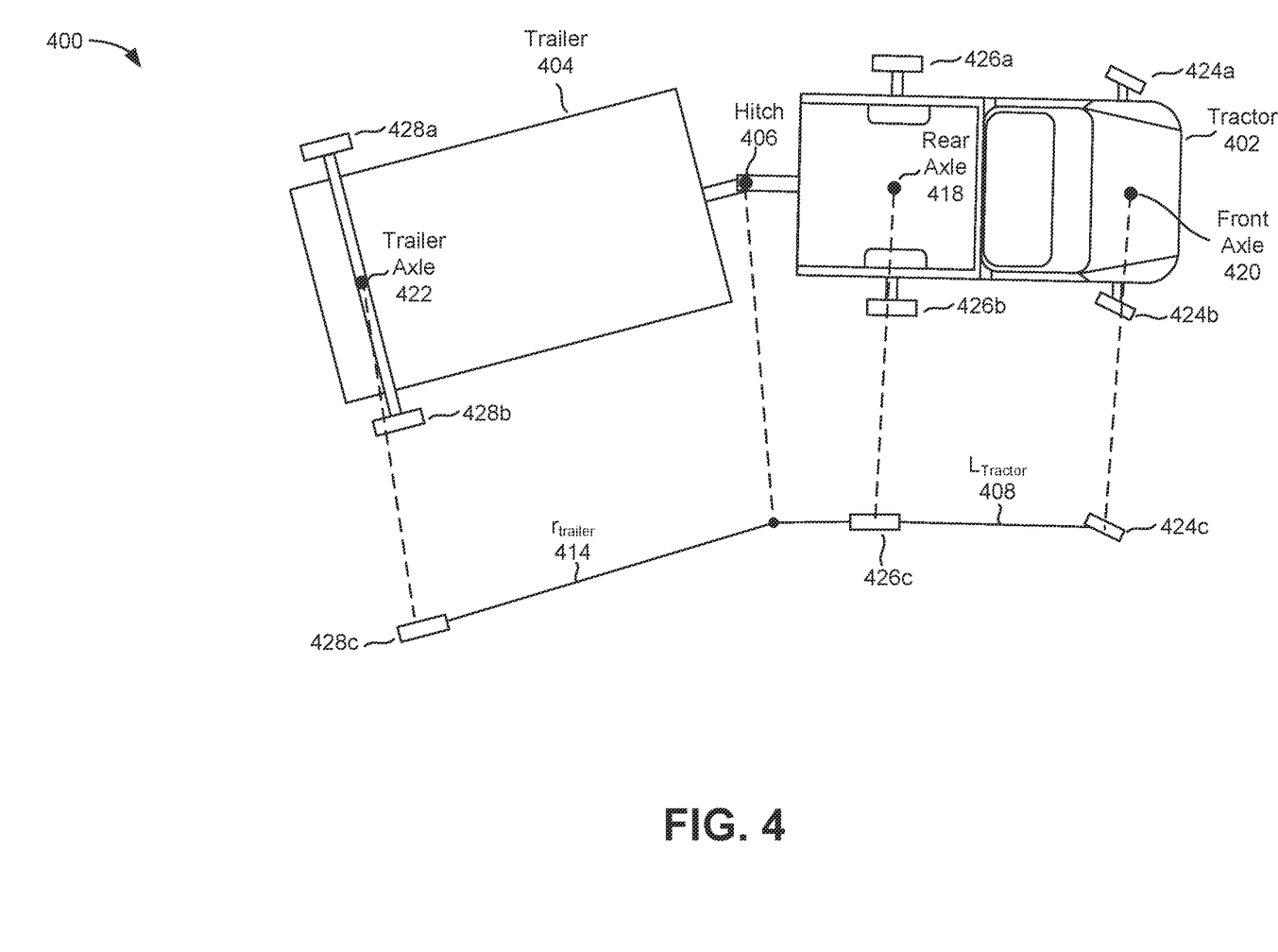
FIG. 4 is a diagram illustrating another example system for simulating movement of an articulated vehicle, in accordance with some examples of the present disclosure.

FIG. 4 illustrates an example system 400 for simulating movement of an articulated vehicle. In some aspects, system 400 may include an articulated vehicle that includes tractor 402 and trailer 404. In some cases, tractor 402 may be coupled to trailer 404 via hitch 406. In some examples, vehicle dynamics of tractor 402 and/or trailer 404 may be determined using one or more models. For example, a kinematic bicycle model (KBM) can be used to determine vehicle dynamics of tractor 402 and/or trailer 404.

In some cases, the front wheel 424a and front wheel 424b of tractor 402 can be modeled using wheel 424c at a center position of front axle 420. In some examples, the rear wheel 426a and rear wheel 426b of tractor 402 can be modeled using wheel 426c at a center position of rear axle 418. In some aspects, wheel 428a and wheel 428b of trailer 404 can be modeled using wheel 428c at a center position of trailer axle 422.

In some examples, vehicle dynamics of tractor 402 and/or trailer 404 can be determined using one or more of equations (1) through (5) as noted above. For example, velocity v of tractor 402 can be determined according to equations (1) and (2). In some aspects, the angular acceleration of tractor 402 can be determined based on the velocity v and $L_{Trailer}$ 408.

In some cases, the velocity v of tractor 402 may be equivalent to the velocity v of hitch 406. In some examples, the velocity v of hitch 406 may be the same for tractor 402 and trailer 404 (e.g., tractor hitch and trailer hitch can have the same velocity).

In some aspects, the angular acceleration of trailer 404 can be determined based on velocity v of hitch 406 and the length $r_{Trailer}$ 414 from hitch 406 to trailer axle 422. For example, the angular acceleration of trailer 404 can be determined using equation (5) listed above.

Figure 5:
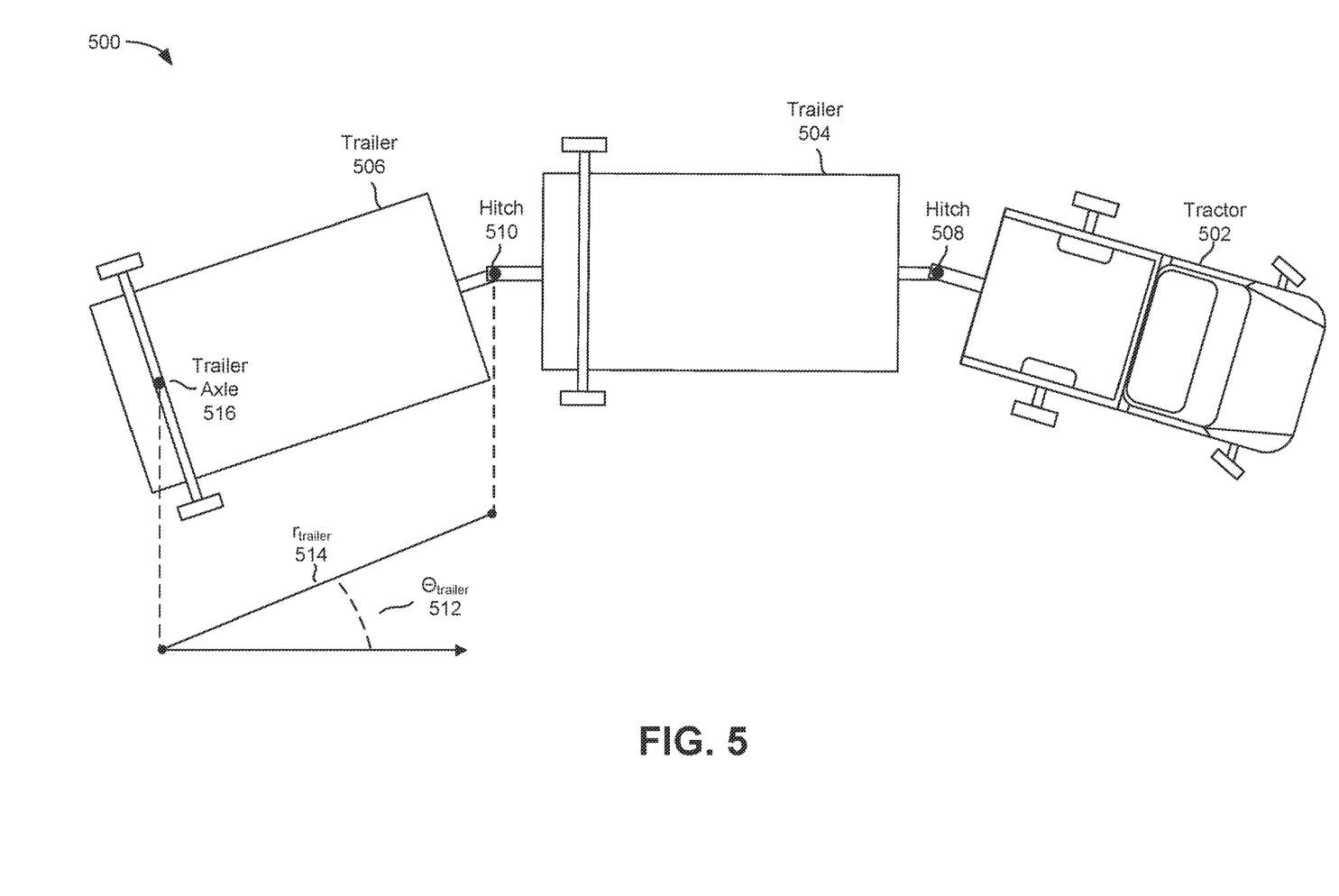
FIG. 5 is a diagram illustrating another example system for simulating movement of an articulated vehicle, in accordance with some examples of the present disclosure.

FIG. 5 illustrates an example system 500 for simulating movement of an articulated vehicle. In some examples, system 500 may include an articulated vehicle having a tractor 502 and multiple trailers (e.g., trailer 504 and trailer 506). For instance, tractor 502 may be coupled to trailer 504 using hitch 508, and trailer 504 may be coupled to trailer 506 using hitch 510. In some aspects, vehicle dynamics of trailer 506 may be determined using one or more models used for determining vehicle dynamics of trailer 504 and/or tractor 502.

In some cases, the velocity v of hitch 510 can be equivalent to the velocity of hitch 508 (e.g., based on the velocity of tractor 502). In some examples, the velocity v of hitch 510 and the length $r_{Trailer}$ 514 between hitch 510 and trailer axle 516 can be used to determine vehicle dynamics of trailer 506. For example, the angular acceleration of trailer 506 (e.g., derivative of $\theta_{Trailer}$ 512) can be determined according to equation (5).

In some cases, additional trailers can be added to system 500. In some instances, the systems and techniques described herein can be used to determine vehicle dynamics for any number of trailers.

Figure 6:
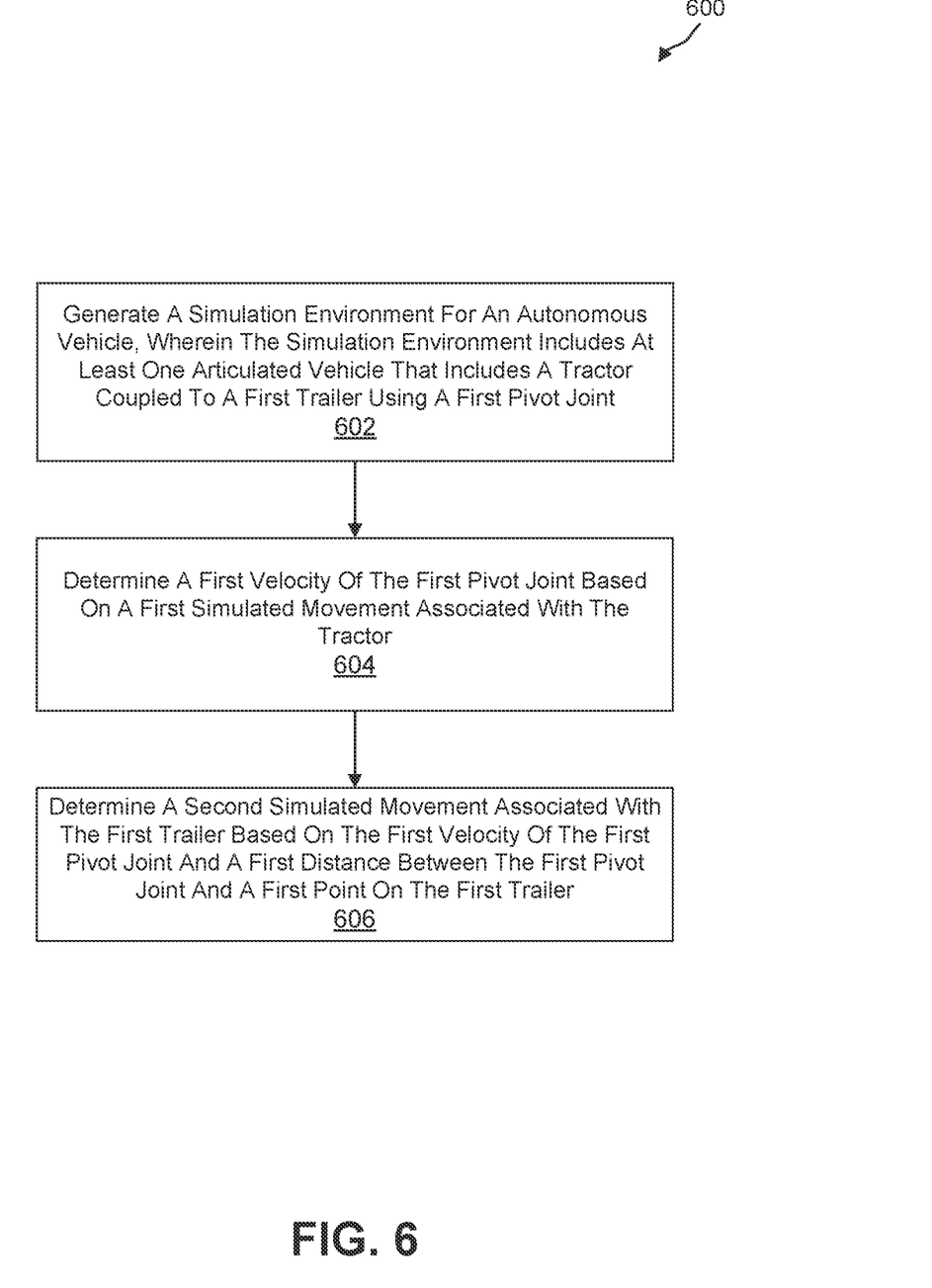
FIG. 6 is a flowchart illustrating an example process for simulating movement of an articulated vehicle, in accordance with some examples of the present disclosure.

FIG. 6 illustrates an example of a process 600 for simulating movement of an articulated vehicle. At block 602, the process 600 includes generating a simulation environment for an autonomous vehicle, wherein the simulation environment includes at least one articulated vehicle that includes a tractor coupled to a first trailer using a first pivot joint. For example, a simulation environment may correspond to system 200 that includes articulated vehicle 201 having tractor 202 coupled to trailer 204 using hitch 206 (e.g., pivot joint).

At block 604, the process 600 includes determining a first velocity of the first pivot joint based on a first simulated movement associated with the tractor. For example, the velocity of hitch 206 can be determined based on a simulated movement of tractor 202. In some aspects, determining the first velocity of the first pivot joint based on the first simulated movement can include determining a translation velocity along a first direction corresponding to a first trailer axis and determining a rotation velocity along a second direction perpendicular to the first trailer axis. For instance, the velocity of hitch 206 can include $V_{Translation}$ 308 (e.g., along direction of trailer axis) and $V_{Rotation}$ 304 (e.g. perpendicular to trailer axis). In some aspects, the first simulated movement associated with the tractor can be based on a kinematic bicycle model (KBM). For example, the first simulated movement of tractor 202 can be based on KBM.

At block 606, the process 600 includes determining a second simulated movement associated with the first trailer based on the first velocity of the first pivot joint and a first distance between the first pivot joint and a first point on the first trailer. For example, simulated movement of trailer 204 can be determined based on the velocity of hitch 206 and distance $r^{Trailer}$ 214 between hitch 206 and trailer axle 222. In some aspects, the second simulated movement associated with the first trailer is in a direction corresponding to an angle between a line from the first point on the first trailer to the first pivot joint and an x-axis. For instance, the second simulated movement can correspond to a change in the heading of trailer 204 (e.g., change in $\theta_{Trailer}$ 216).

In some examples, the first point on the first trailer can correspond to a center of a wheel axle of the first trailer. For example, the first point on the first trailer can correspond to trailer axle 222. In some cases, the first point on the first trailer can correspond to a center of gravity of the first trailer. For instance, the first point on the first trailer can correspond to a center of gravity of trailer 204.

In some aspects, the at least one articulated vehicle can include a second trailer that is coupled to the first trailer using a second pivot joint. For example, an articulated vehicle may include tractor 502 coupled to trailer 504 using hitch 508 and trailer 506 coupled to trailer 504 using hitch 510.

In some examples, the process 600 may include determining a second velocity of the second pivot joint based on the second simulated movement associated with the first trailer and determining a third simulated movement associated with the second trailer based on the second velocity of the second pivot joint and a second distance between the second pivot joint and a second point on the second trailer. For example, a simulated movement of trailer 506 can be based on the velocity of hitch 510 and a distance $r_{Trailer}$ 514 between hitch 510 and trailer axle 516.

In some aspects, the process 600 can include training a machine learning model associated with an autonomous vehicle to predict movement of one or more articulated vehicles based on the second simulated movement. For example, AV 102 may include one or more machine learning models that may be associated with prediction stack 112. In some cases, simulated vehicle dynamics associated with tractor 202 and/or trailer 204 can be used to train machine learning models that predict movement of an articulated vehicle.

In some cases, the process 600 can include adjusting one or more tuning parameters corresponding to an autonomous vehicle based on at least one of the first simulated movement and the second simulated movement. For example, AV 102 may include tuning parameters that may be used by one or more of the perception stack 112, the prediction stack 116, the planning stack 118, and/or the control stack 122. In some cases, the tuning parameters may be used to manage or control operation of AV 102. In some examples, the tuning parameters may be used to identify an articulated vehicle and determine a predicted path for the articulated vehicle. In some examples, the tuning parameters may be adjusted based on vehicle dynamics determined by system 200 (e.g., simulation platform 156.)

Figure 7:
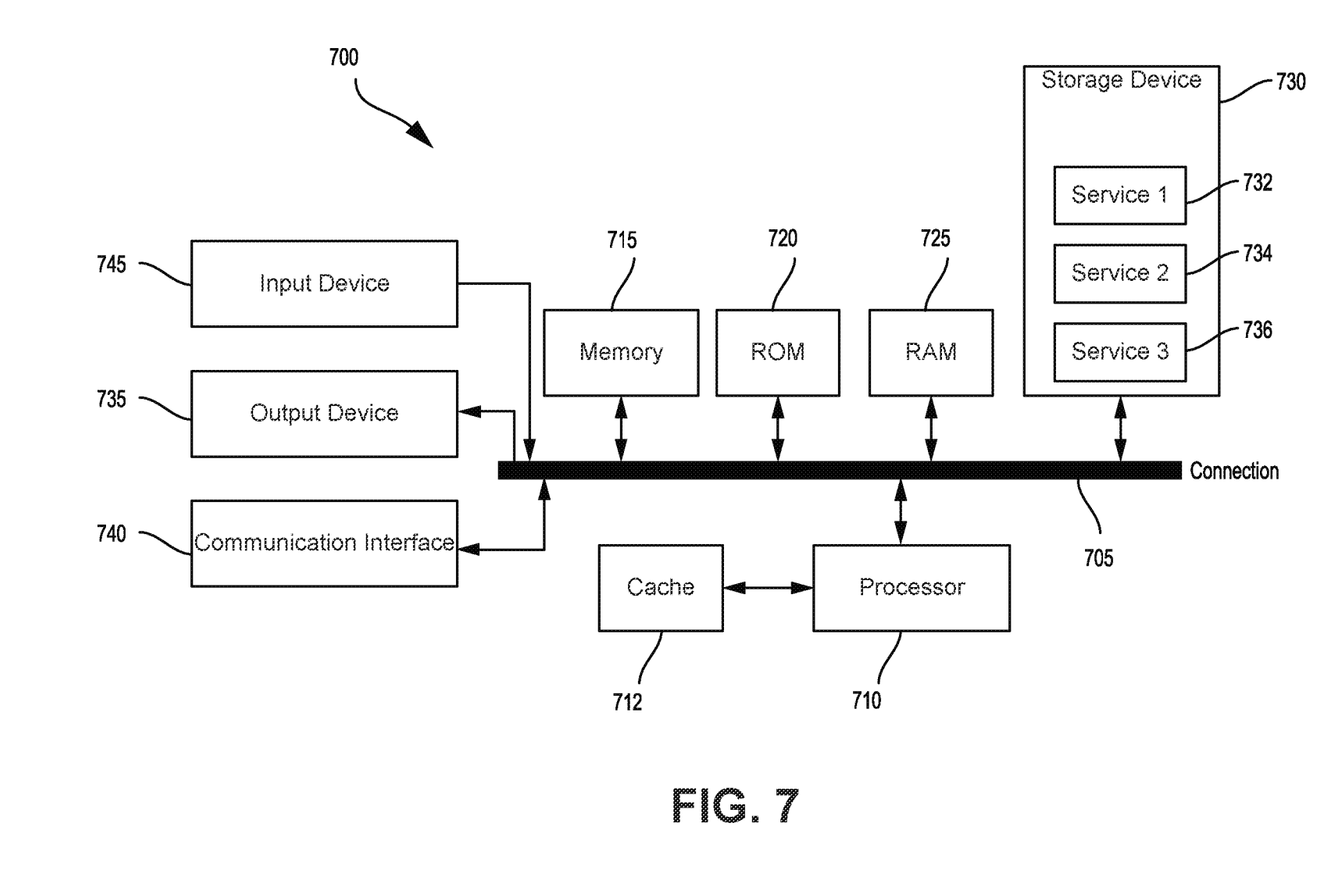
FIG. 7 is a diagram illustrating an example system architecture for implementing certain aspects described herein.

FIG. 7 illustrates an example processor-based system with which some aspects of the subject technology can be implemented. For example, processor-based system 700 can be any computing device making up internal computing system 110, remote computing system 190, a passenger device executing the ridesharing application 172, or any component thereof in which the components of the system are in communication with each other using connection 705. Connection 705 can be a physical connection via a bus, or a direct connection into processor 710, such as in a chipset architecture. Connection 705 can also be a virtual connection, networked connection, or logical connection.

In some examples, computing system 700 is a distributed system in which the functions described in this disclosure can be distributed within a datacenter, multiple data centers, a peer network, etc. In some cases, one or more of the described system components represents many such components each performing some or all of the function for which the component is described. In some aspects, the components can be physical or virtual devices.

Example system 700 includes at least one processing unit (CPU or processor) 710 and connection 705 that couples various system components including system memory 715, such as read-only memory (ROM) 720 and random-access memory (RAM) 725 to processor 710. Computing system 700 can include a cache of high-speed memory 712 connected directly with, in close proximity to, and/or integrated as part of processor 710.

Processor 710 can include any general-purpose processor and a hardware service or software service, such as services 732, 734, and 736 stored in storage device 730, configured to control processor 710 as well as a special-purpose processor where software instructions are incorporated into the actual processor design. Processor 710 may essentially be a completely self-contained computing system, containing multiple cores or processors, a bus, memory controller, cache, etc. A multi-core processor may be symmetric or asymmetric.

To enable user interaction, computing system 700 can include an input device 745, which can represent any number of input mechanisms, such as a microphone for speech, a touch-sensitive screen for gesture or graphical input, keyboard, mouse, motion input, speech, etc. Computing system 700 can also include output device 735, which can be one or more of a number of output mechanisms known to those of skill in the art. In some instances, multimodal systems can enable a user to provide multiple types of input/output to communicate with computing system 700. Computing system 700 can include communications interface 740, which can generally govern and manage the user input and system output. The communication interface may perform or facilitate receipt and/or transmission wired or wireless communications via wired and/or wireless transceivers, including those making use of an audio jack/plug, a microphone jack/plug, a universal serial bus (USB) port/plug, an Apple® Lightning®, port/plug, an Ethernet port/plug, a fiber optic port/plug, a proprietary wired port/plug, a BLUETOOTH® wireless signal transfer, a BLUETOOTH® low energy (BLE) wireless signal transfer, an IBEACON® wireless signal transfer, a radio-frequency identification (RFID) wireless signal transfer, near-field communications (NFC) wireless signal transfer, dedicated short range communication (DSRC) wireless signal transfer, 802.11 Wi-Fi wireless signal transfer, wireless local area network (WLAN) signal transfer, Visible Light Communication (VLC), Worldwide Interoperability for Microwave Access (WiMAX), Infrared (IR) communication wireless signal transfer, Public Switched Telephone Network (PSTN) signal transfer, Integrated Services Digital Network (ISDN) signal transfer, 3G/4G/9G/LTE cellular data network wireless signal transfer, ad-hoc network signal transfer, radio wave signal transfer, microwave signal transfer, infrared signal transfer, visible light signal transfer, ultraviolet light signal transfer, wireless signal transfer along the electromagnetic spectrum, or some combination thereof.

Communications interface 740 may also include one or more Global Navigation Satellite System (GNSS) receivers or transceivers that are used to determine a location of the computing system 700 based on receipt of one or more signals from one or more satellites associated with one or more GNSS systems. GNSS systems include, but are not limited to, the US-based Global Positioning System (GPS), the Russia-based Global Navigation Satellite System (GLONASS), the China-based BeiDou Navigation Satellite System (BDS), and the Europe-based Galileo GNSS. There is no restriction on operating on any particular hardware arrangement, and therefore the basic features here may easily be substituted for improved hardware or firmware arrangements as they are developed.

Storage device 730 can be a non-volatile and/or non-transitory computer-readable memory device and can be a hard disk or other types of computer readable media which can store data that are accessible by a computer, such as magnetic cassettes, flash memory cards, solid state memory devices, digital versatile disks, cartridges, a floppy disk, a flexible disk, a hard disk, magnetic tape, a magnetic strip/stripe, any other magnetic storage medium, flash memory, memristor memory, any other solid-state memory, a compact disc read only memory (CD-ROM) optical disc, a rewritable compact disc (CD) optical disc, digital video disk (DVD) optical disc, a blu-ray disc (BDD) optical disc, a holographic optical disk, another optical medium, a secure digital (SD) card, a micro secure digital (microSD) card, a Memory Stick® card, a smartcard chip, a EMV chip, a subscriber identity module (SIM) card, a mini/micro/nano/pico SIM card, another integrated circuit (IC) chip/card, random access memory (RAM), static RAM (SRAM), dynamic RAM (DRAM), read-only memory (ROM), programmable read-only memory (PROM), erasable programmable read-only memory (EPROM), electrically erasable programmable read-only memory (EEPROM), flash EPROM (FLASHEPROM), cache memory (L1/L2/L3/L4/L9/L #), resistive random-access memory (RRAM/ReRAM), phase change memory (PCM), spin transfer torque RAM (STT-RAM), another memory chip or cartridge, and/or a combination thereof.

Storage device 730 can include software services, servers, services, etc., that when the code that defines such software is executed by the processor 710, causes the system to perform a function. In some examples, a hardware service that performs a particular function can include the software component stored in a computer-readable medium in connection with the necessary hardware components, such as processor 710, connection 705, output device 735, etc., to carry out the function.

As understood by those of skill in the art, machine-learning techniques can vary depending on the desired implementation. For example, machine-learning schemes can utilize one or more of the following, alone or in combination: hidden Markov models; recurrent neural networks; convolutional neural networks (CNNs); deep learning; Bayesian symbolic methods; general adversarial networks (GANs); support vector machines; image registration methods; applicable rule-based system. Where regression algorithms are used, they may include including but are not limited to: a Stochastic Gradient Descent Regressor, and/or a Passive Aggressive Regressor, etc.

Machine learning classification models can also be based on clustering algorithms (e.g., a Mini-batch K-means clustering algorithm), a recommendation algorithm (e.g., a Miniwise Hashing algorithm, or Euclidean Locality-Sensitive Hashing (LSH) algorithm), and/or an anomaly detection algorithm, such as a Local outlier factor. Additionally, machine-learning models can employ a dimensionality reduction approach, such as, one or more of; a Mini-batch Dictionary Learning algorithm, an Incremental Principal Component Analysis (PCA) algorithm, a Latent Dirichlet Allocation algorithm, and/or a Mini-batch K-means algorithm, etc.

Aspects within the scope of the present disclosure may also include tangible and/or non-transitory computer-readable storage media or devices for carrying or having computer-executable instructions or data structures stored thereon. Such tangible computer-readable storage devices can be any available device that can be accessed by a general purpose or special purpose computer, including the functional design of any special purpose processor as described above. By way of example, and not limitation, such tangible computer-readable devices can include RAM, ROM, EEPROM, CD-ROM or other optical disk storage, magnetic disk storage or other magnetic storage devices, or any other device which can be used to carry or store desired program code in the form of computer-executable instructions, data structures, or processor chip design. When information or instructions are provided via a network or another communications connection (either hardwired, wireless, or combination thereof) to a computer, the computer properly views the connection as a computer-readable medium. Thus, any such connection is properly termed a computer-readable medium. Combinations of the above should also be included within the scope of the computer-readable storage devices.

Computer-executable instructions include, for example, instructions and data which cause a general-purpose computer, special-purpose computer, or special-purpose processing device to perform a certain function or group of functions. By way of example, computer-executable instructions can be used to implement perception system functionality for determining when sensor cleaning operations are needed or should begin. Computer-executable instructions can also include program modules that are executed by computers in stand-alone or network environments. Generally, program modules include routines, programs, components, data structures, objects, and the functions inherent in the design of special-purpose processors, etc. that perform tasks or implement abstract data types. Computer-executable instructions, associated data structures, and program modules represent examples of the program code means for executing steps of the methods disclosed herein. The particular sequence of such executable instructions or associated data structures represents examples of corresponding acts for implementing the functions described in such steps.

Other examples of the disclosure may be practiced in network computing environments with many types of computer system configurations, including personal computers, hand-held devices, multi-processor systems, microprocessor-based or programmable consumer electronics, network PCs, minicomputers, mainframe computers, and the like. Aspects of the disclosure may also be practiced in distributed computing environments where tasks are performed by local and remote processing devices that are linked (either by hardwired links, wireless links, or by a combination thereof) through a communications network. In a distributed computing environment, program modules can be located in both local and remote memory storage devices.

SELECTED EXAMPLES

Illustrative examples of the disclosure include:

Aspect 1. A method comprising: generating a simulation environment for an autonomous vehicle, wherein the simulation environment includes at least one articulated vehicle that includes a tractor coupled to a first trailer using a first pivot joint; determining a first velocity of the first pivot joint based on a first simulated movement associated with the tractor; and determining a second simulated movement associated with the first trailer based on the first velocity of the first pivot joint and a first distance between the first pivot joint and a first point on the first trailer.

Aspect 2. The method of Aspect 1, wherein the at least one articulated vehicle includes a second trailer that is coupled to the first trailer using a second pivot joint.

Aspect 3. The method of Aspect 2, further comprising: determining a second velocity of the second pivot joint based on the second simulated movement associated with the first trailer; and determining a third simulated movement associated with the second trailer based on the second velocity of the second pivot joint and a second distance between the second pivot joint and a second point on the second trailer.

Aspect 4. The method of any of Aspects 1 to 3, wherein the second simulated movement associated with the first trailer is in a direction corresponding to an angle between a line from the first point on the first trailer to the first pivot joint and an x-axis.

Aspect 5. The method of any of Aspects 1 to 4, wherein the first point on the first trailer corresponds to a center of a wheel axle of the first trailer.

Aspect 6. The method of any of Aspects 1 to 5, wherein the first point of the first trailer corresponds to a center of gravity of the first trailer.

Aspect 7. The method of any of Aspects 1 to 6, wherein determining the first velocity of the first pivot joint based on the first simulated movement comprises: determining a translation velocity along a first direction corresponding to a first trailer axis; and determining a rotation velocity along a second direction perpendicular to the first trailer axis.

Aspect 8. The method of any of Aspects 1 to 7, wherein the first simulated movement associated with the tractor is based on a kinematic bicycle model.

Aspect 9: The method of any of Aspects 1 to 8, further comprising: training a machine learning model associated with an autonomous vehicle to predict movement of one or more articulated vehicles based on the second simulated movement.

Aspect 10: The method of any of Aspects 1 to 9, further comprising: adjusting one or more tuning parameters corresponding to an autonomous vehicle based on at least one of the first simulated movement and the second simulated movement.

Aspect 11: An apparatus comprising: at least one memory; and at least one processor coupled to the at least one memory, wherein the at least one processor is configured to perform operations in accordance with any one of Aspects 1 to 10.

Aspect 12: An apparatus comprising means for performing operations in accordance with any one of Aspects 1 to 10.

Aspect 13: A non-transitory computer-readable medium comprising instructions that, when executed by an apparatus, cause the apparatus to perform operations in accordance with any one of Aspects 1 to 10.

The various examples described above are provided by way of illustration only and should not be construed to limit the scope of the disclosure. For example, the principles herein apply equally to optimization as well as general improvements. Various modifications and changes may be made to the principles described herein without following the examples and applications illustrated and described herein, and without departing from the scope of the disclosure.

Claim language or other language in the disclosure reciting "at least one of" a set and/or "one or more" of a set indicates that one member of the set or multiple members of the set (in any combination) satisfy the claim. For example, claim language reciting "at least one of A and B" or "at least one of A or B" means A, B, or A and B. In another example, claim language reciting "at least one of A, B, and C" or "at least one of A, B. or C" means A. B, C, or A and B, or A and C, or B and C, or A and B and C. The language "at least one of" a set and/or "one or more" of a set does not limit the set to the items listed in the set. For example, claim language reciting "at least one of A and B" or "at least one of A or B" can mean A, B, or A and B, and can additionally include items not listed in the set of A and B.

What is claimed is:

1. A method comprising:
generating a simulation environment for an autonomous vehicle, wherein the simulation environment includes at least one articulated vehicle that includes a tractor coupled to a first trailer using a first pivot joint;
determining a first velocity of the first pivot joint based on a first simulated movement associated with the tractor;
determining a second simulated movement associated with the first trailer based on the first velocity of the first pivot joint and a first distance between the first pivot joint and a first point on the first trailer, wherein the at least one articulated vehicle includes a second trailer that is coupled to the first trailer using a second pivot joint;
determining a second velocity of the second pivot joint based on the second simulated movement associated with the first trailer; and
determining a third simulated movement associated with the second trailer based on the second velocity of the second pivot joint and a second distance between the second pivot joint and a second point on the second trailer.

2. The method of claim 1, wherein the second simulated movement associated with the first trailer is in a direction corresponding to an angle between a line from the first point on the first trailer to the first pivot joint and an x-axis.

3. The method of claim 1, wherein the first point on the first trailer corresponds to a center of a wheel axle of the first trailer.

4. The method of claim 1, wherein the first point of the first trailer corresponds to a center of gravity of the first trailer.

5. The method of claim 1, wherein determining the first velocity of the first pivot joint based on the first simulated movement comprises:
determining a translation velocity along a first direction corresponding to a first trailer axis; and
determining a rotation velocity along a second direction perpendicular to the first trailer axis.

6. The method of claim 1, wherein the first simulated movement associated with the tractor is based on a kinematic bicycle model.

7. An apparatus comprising:
at least one memory comprising instructions; and
at least one processor configured to execute the instructions and cause the apparatus to:
generate a simulation environment for an autonomous vehicle, wherein the simulation environment includes at least one articulated vehicle that includes a tractor coupled to a first trailer using a first pivot joint;
determine a first velocity of the first pivot joint based on a first simulated movement associated with the tractor;
determine a second simulated movement associated with the first trailer based on the first velocity of the first pivot joint and a first distance between the first pivot joint and a first point on the first trailer, wherein the at least one articulated vehicle includes a second trailer that is coupled to the first trailer using a second pivot joint;
determine a second velocity of the second pivot joint based on the second simulated movement associated with the first trailer; and
determine a third simulated movement associated with the second trailer based on the second velocity of the second pivot joint and a second distance between the second pivot joint and a second point on the second trailer.

8. The apparatus of claim 7, wherein the second simulated movement associated with the first trailer is in a direction corresponding to an angle between a line from the first point on the first trailer to the first pivot joint and an x-axis.

9. The apparatus of claim 7, wherein the first point on the first trailer corresponds to a center of a wheel axle of the first trailer.

10. The apparatus of claim 7, wherein the first point of the first trailer corresponds to a center of gravity of the first trailer.

11. The apparatus of claim 7, wherein to determine the first velocity of the first pivot joint based on the first simulated movement the at least one processor is further configured to cause the apparatus to:
determine a translation velocity along a first direction corresponding to a first trailer axis; and
determine a rotation velocity along a second direction perpendicular to the first trailer axis.

12. The apparatus of claim 7, wherein the first simulated movement associated with the tractor is based on a kinematic bicycle model.

13. A non-transitory computer-readable storage medium having stored thereon instructions which, when executed by one or more processors, cause the one or more processors to:
generate a simulation environment for an autonomous vehicle, wherein the simulation environment includes at least one articulated vehicle that includes a tractor coupled to a first trailer using a first pivot joint;
determine a first velocity of the first pivot joint based on a first simulated movement associated with the tractor; and
determine a second simulated movement associated with the first trailer based on the first velocity of the first pivot joint and a first distance between the first pivot joint and a first point on the first trailer, wherein the at least one articulated vehicle includes a second trailer that is coupled to the first trailer using a second pivot joint;
determine a second velocity of the second pivot joint based on the second simulated movement associated with the first trailer; and
determine a third simulated movement associated with the second trailer based on the second velocity of the second pivot joint and a second distance between the second pivot joint and a second point on the second trailer.

14. The non-transitory computer-readable storage medium of claim 13, wherein the second simulated movement associated with the first trailer is in a direction corresponding to an angle between a line from the first point on the first trailer to the first pivot joint and an x-axis.

15. The non-transitory computer-readable storage medium of claim 13, wherein the first point on the first trailer corresponds to a center of a wheel axle of the first trailer.

16. The non-transitory computer-readable storage medium of claim 13, comprising further instructions which, when executed by the one or more processors, cause the one or more processors to:
 determine a translation velocity along a first direction corresponding to a first trailer axis; and
 determine a rotation velocity along a second direction perpendicular to the first trailer axis.

\* \* \* \* \*